US006843064B2

(12) United States Patent
Khalili et al.

(10) Patent No.: US 6,843,064 B2
(45) Date of Patent: Jan. 18, 2005

(54) METHOD AND APPARATUS FOR TURBULENT REFRIGERANT FLOW TO EVAPORATOR

(75) Inventors: Kaveh Khalili, Boulder City, NV (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 10/423,041

(22) Filed: Apr. 23, 2003

(65) Prior Publication Data

US 2004/0211196 A1 Oct. 28, 2004

(51) Int. Cl.[7] .............................. F25B 1/00; F25B 15/00; G05D 23/00
(52) U.S. Cl. .............................. 62/115; 62/103; 62/141; 236/93 B
(58) Field of Search .......................... 62/115, 103, 498, 62/141; 236/93 B

(56) References Cited

U.S. PATENT DOCUMENTS

| 2,164,223 | A | * | 6/1939 | Rodman ........................ 62/93 |
|---|---|---|---|---|
| 2,669,849 | A | * | 2/1954 | Lange ........................... 62/225 |
| 4,596,122 | A | * | 6/1986 | Kantner ........................ 62/141 |
| 5,007,247 | A | * | 4/1991 | Danig .......................... 62/174 |
| 5,077,983 | A | * | 1/1992 | Dudley ....................... 62/228.1 |
| 5,598,721 | A | | 2/1997 | Rockenfeller et al. ......... 62/480 |
| 5,628,205 | A | | 5/1997 | Rockenfeller et al. ......... 62/480 |
| 5,664,427 | A | | 9/1997 | Rockenfeller et al. ......... 62/112 |
| 5,666,819 | A | | 9/1997 | Rockenfeller et al. ......... 62/480 |
| 5,675,982 | A | * | 10/1997 | Kirol et al. .................... 62/225 |
| 5,901,572 | A | | 5/1999 | Peiffer et al. .................. 62/480 |
| 5,901,780 | A | | 5/1999 | Zeigler et al. ................. 165/42 |
| 6,272,871 | B1 | * | 8/2001 | Eisenhour .................... 62/225 |
| 6,276,166 | B1 | | 8/2001 | Sarkisian et al. ............. 62/480 |
| 6,282,919 | B1 | | 9/2001 | Rockenfeller et al. ......... 62/480 |
| 6,401,471 | B1 | | 6/2002 | Wightman .................... 62/222 |
| 6,584,788 | B1 | * | 7/2003 | Sarkisian et al. ............. 62/141 |

* cited by examiner

*Primary Examiner*—William C. Doerrler
(74) *Attorney, Agent, or Firm*—Knobbe, Martens, Olson & Bear, LLP

(57) ABSTRACT

A method of reducing superheat fluctuation and improving evaporator heat transfer comprises creating turbulent flow in refrigerant supplied to the evaporator.

24 Claims, 5 Drawing Sheets

METHOD AND APPARATUS FOR TURBULENT REFRIGERANT FLOW TO EVAPORATOR

BACKGROUND OF THE INVENTION

1. Field of the Invention

This invention relates to HVAC and more specifically to refrigeration and air conditioning systems in which a condensed refrigerant is vaporized in an evaporator to provide cooling and air conditioning. A specialized field includes aqua-ammonia absorption cooling and heating systems utilizing ammonia refrigerant and aqueous absorbents.

2. Description of the Related Art

Improved aqua-ammonia are described in the following related U.S. patent application Ser. No. 09/479,277 filed Jan. 5, 2000 (ROCKYR.099A); 09/709,875 filed Nov. 10, 2000 (ROCKYR.103A); 10/125,297 filed Apr. 16, 2002 (ROCKYR.104A); 10/125,298 Apr. 16, 2002 (ROCKYR.112A); and 10/125,125 filed Apr. 16, 2002 (ROCKYR.113A). The descriptions of the aforesaid patent applications are incorporated herein by reference.

SUMMARY OF THE INVENTION

In the method and apparatus described herein, in cooling, chiller, refrigeration or heat pump systems in which refrigerant is vaporized in an evaporator, improved performance is achieved by creating a turbulent flow in the refrigerant supplied to the evaporator. The turbulent flow is accomplished by positively starting and stopping the refrigerant flow at or adjacent to the evaporator inlet at rapid frequencies sufficient to create the desired turbulence. In a preferred embodiment, a mechanically operated thermostic expansion valve having suitable inlet/outlet orifice sizes to provide positive valve opening and closing at a rate of between about 0.5 and about 500 hertz cooperates with the refrigerant flow piping, to create the desired turbulence.

DETAILED DESCRIPTION OF THE PREFERRED EMBODIMENT

As described herein, supplying refrigerant to the evaporator in turbulent flow substantially improves the efficiency of the evaporator, and often the performance of the condenser from which the refrigerant is directed. For high efficiency operation, the refrigerant fluid should change state from liquid to vapor in a large portion (in excess of at least 70% and preferably greater than 90%) of the cooling coils within the evaporator. As the fluid changes state from liquid to vapor, it absorbs great deal of energy, latent heat of vaporization. In contrast, in a vapor state a refrigerant transfers only a little amount of energy. The advantages realized by turbulent flow of the refrigerant supplied to the evaporator include higher operation efficiency, thereby improved energy efficiency, increased cooling capacity, and faster pull-down or compressor size reduction, as compared to using capillary tubes or thermostatic expansion valves, which operate to provide only laminar refrigerant flow. Improved evaporator efficiency results in reduced superheat. Due to reduction in superheat required using the pulsation method described herein, the evaporator surface is better utilized than conventional means leading to higher operation efficiency. These as well as other advantages will be evident to those skilled in the art. As used herein, the term "turbulent flow" and "turbulence" means flow of liquid in which local velocities and pressure fluctuate irregularly, in a random manner, in contrast to laminar flow in which all particles of the fluid move in distinct and separate lines.

Figure 6:
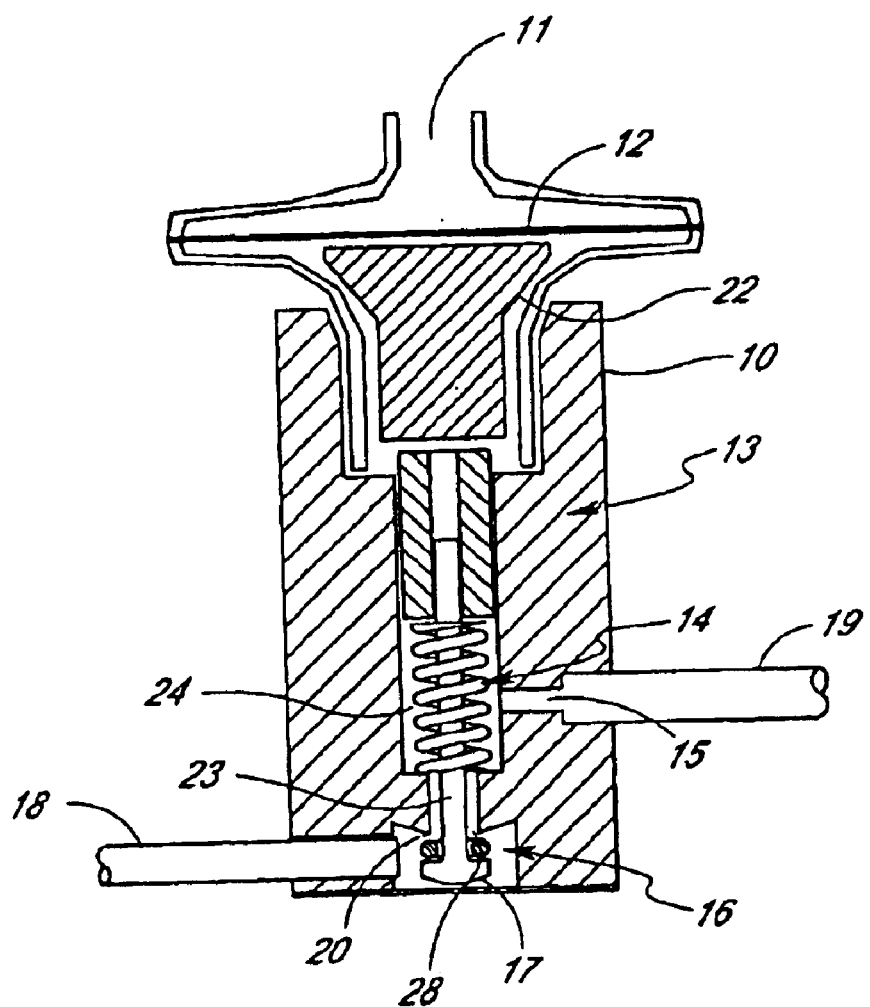
FIG. 6 is a sectional view of a preferred mechanically operated thermostatic expansion valve used in the preferred embodiment described herein.

According to a preferred embodiment, turbulent refrigerant flow is achieved by rapidly starting and stopping or pulsing the refrigerant flow directed to the evaporator from the condenser. To achieve such an effect, a mechanically operated valve capable of being rapidly alternately substantially fully opened and fully closed is provided in the refrigerant supply piping at or adjacent to the evaporator inlet. Such a valve includes a refrigerant inlet flow control port and a valve or plug device and operating components driven by a temperature sensing bulb and diaphragm or bellows for opening and closing the flow control port and capable of rapid positive alternating shut-off (closing) and opening at a frequency of between about 0.5 and about 500 hertz in order to achieve the necessary refrigerant turbulent flow. Such a mechanically operated valve operates without any electrical energy, solenoids or other electrical assisted actuations or controls. A preferred valve is a thermostatic expansion valve having a refrigerant control port as an inlet port, an outlet port, and a valve cavity between the inlet and outlet ports. Such a valve is of the type described in U.S. Pat. No. 5,675,982, the description of which is incorporated herein by reference. Such a preferred valve is shown in FIG. 6. The valve shown comprises a valve body 10 having an interior cavity 24. Valve seat 20 defines valve port 28 which is opened and closed as seal 16, seated against valve plug 17 is moved upwardly and downwardly in response to the movement of diaphragm 12 against bar 22 and plunger 13 which are urged toward the diaphragm by spring 14. The assembly includes bulb connection port or pressure port 11, inlet pipe 18 and outlet pipe 19. The diaphragm is urged against the upper surface of bar 22 bY pressure from a bulb, not shown, via the bulb connection port 11. Inlet pipe 18 communicates with a condenser or a liquid refrigerant reservoir (not shown) and outlet pipe 19 communicates with the evaporator of the refrigeration system. A restriction or restricted port 15 is located between the interior valve cavity 24 and outlet pipe 19. A valve stem or rod 23 connects the piston to valve plug 17, and spring 14 urges the piston upwardly toward the diaphragm to close the inlet port. Pressure from a bulb on the bulb side of the diaphragm via pressure port 11 urges the diaphragm against bar 22 and piston 13 to compress spring 14 and force seal 16 downwardly to open valve inlet port 28. Pressure in the cavity also pushes against valve plug 17 for opening valve port 28.

Forces tending to close the valve are: pressure against the evaporator (bottom) side of the diaphragm 12, i.e., the pressure in the valve cavity, the force of spring 14, and condenser pressure on the valve plus 17 via inlet pipe 18. When the sum of the forces tending to open the valve exceeds the sum of the forces tending to close the valve, the valve opens. Otherwise, the valve is designed to remain closed. Alternatively, the valve may be designed such that the condenser pressure tends to open the valve. However, the valve design of the example shown in the drawing utilizes condenser pressure for closing the valve for relatively high condenser pressures such as encountered where ammonia refrigerant is used. However, to supply the necessary refrigerant flow turbulence, such a valve must be designed within important and specific limits as described herein.

In order to achieve the desired evaporator operating improvements, turbulence of refrigerant flow supplied to the evaporator will have a peak Reynolds number of at least about 2,000. Higher turbulence may be achieved, for example, up to a Reynolds number of about $3 \times 10^5$, depending on the type and capacity of the system and its components, but Reynolds numbers below 2,000, in the laminar flow range, will not achieve desired performance. In order to achieve the desired turbulent flow the valve is positively opened and closed rapidly at frequencies from 0.5 hertz and up to about 500 hertz. Frequencies between about 2 and about 40 hertz are often found most practical to achieve the desired turbulent effect which enhances heat transfer both upstream and downstream from the rapidly pulsing valve. Thus, as previously stated, not only is evaporator efficiency improved, but condenser efficiency may also be improved.

To practice the method and create the necessary turbulent flow, a suitable mechanically operated valve must have a properly sized inlet, outlet and valve cavity volume. The size of the outlet orifice may be preferably selected to be more restrictive than the inlet seat to ensure that the valve recloses quickly, but must be small enough to allow refrigerant flow at the design rate with only one or two psia pressure drop. The valve inlet seat is sized to make it large enough so that it can feed liquid to the cavity faster than two-phase refrigerant will bleed from the cavity. Moreover, for suitable valve operation, valve inlet/valve outlet ratios are such that outlet pressure drop is not greater than inlet pressure drop. Again, preferably an effective inlet flow area at least as large as the outlet orifice area is desired. The effective inlet flow area may be determined by two different methods. A convenient measure of the effective inlet flow area is the area of the inlet port minus the area of a valve stem which extends through the inlet port. A preferred valve will have an effective inlet area/outlet area ratio of between about 0.2 and about 5, respectively. More preferably, the effective inlet/outlet ratio is between 0.21 and 4.1 and with a suitably sized valve cavity between the inlet and outlet.

Valve cavity sizes will depend on the volume design of the superheat region of the evaporator, which should be at least twice the volume of the valve cavity. Thus, all refrigerant released from 1 or 2 cavity volumes should not cause evaporator flooding. As a practical matter most valve applications will have a cavity volume of about 1 cc or more. However, smaller valve cavity designs may be used for very small evaporators made for low-wattage electronics cooling or the like.

To operate such a mechanical valve, a temperature sensing bulb having a suitable bulb charge cooperates with a diaphragm, bellows or similar moveable member in response to bulb charge vaporization to drive the valve operation. Preferred bulb charges are disclosed in U.S. application Ser. No. 10/125,297 (ROCKYR.104A). Such preferred bulb charges include a mixture of propane and butane, especially mixtures having a major amount of propane and more preferably between about 60% and about 90% propane and between about 10% and about 40% butane, by weight. Specific bulb charge composition is selected to give the desired superheat response versus evaporator temperature. It is usually desirable that superheat be set at normal operating temperature, and that a charge be selected that gives higher superheat at higher evaporator temperatures. This response helps avoid flooding during compressor startup (or sorption start) when capacity is higher and the bulb warm.

Figure 2:
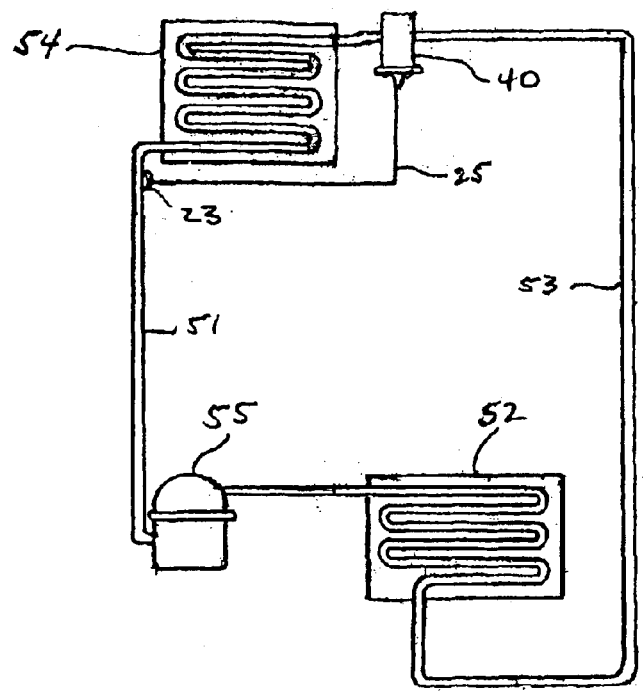
FIG. 2 is a schematic illustration of a vapor compression cooling apparatus having a TXV valve for creating turbulent refrigerant flow to an evaporator.

The method described herein may be used for improving any vapor compression operated refrigerator, cooling system or heat pump evaporator, regardless of the specific type of refrigerant used. Such systems include those described in U.S. Pat. Nos. 5,628,205, 5,664,427, 5,666,819, 5,598,721, 5,901,780, 5,901,572, 6,282,919 and 6,276,166. FIG. 2 schematically shows a vapor compression cooling system using the method described herein. The system includes a motor driven compressor 55, condenser 52, and evaporator 54. A mechanically operated valve 40 for creating turbulent flow in refrigerant supplied to evaporator 54 is installed in liquid line 53. Temperature sensing bulb 23 communicating with the valve 40 is positioned along suction line 51, near the evaporator outlet.

Figure 1:
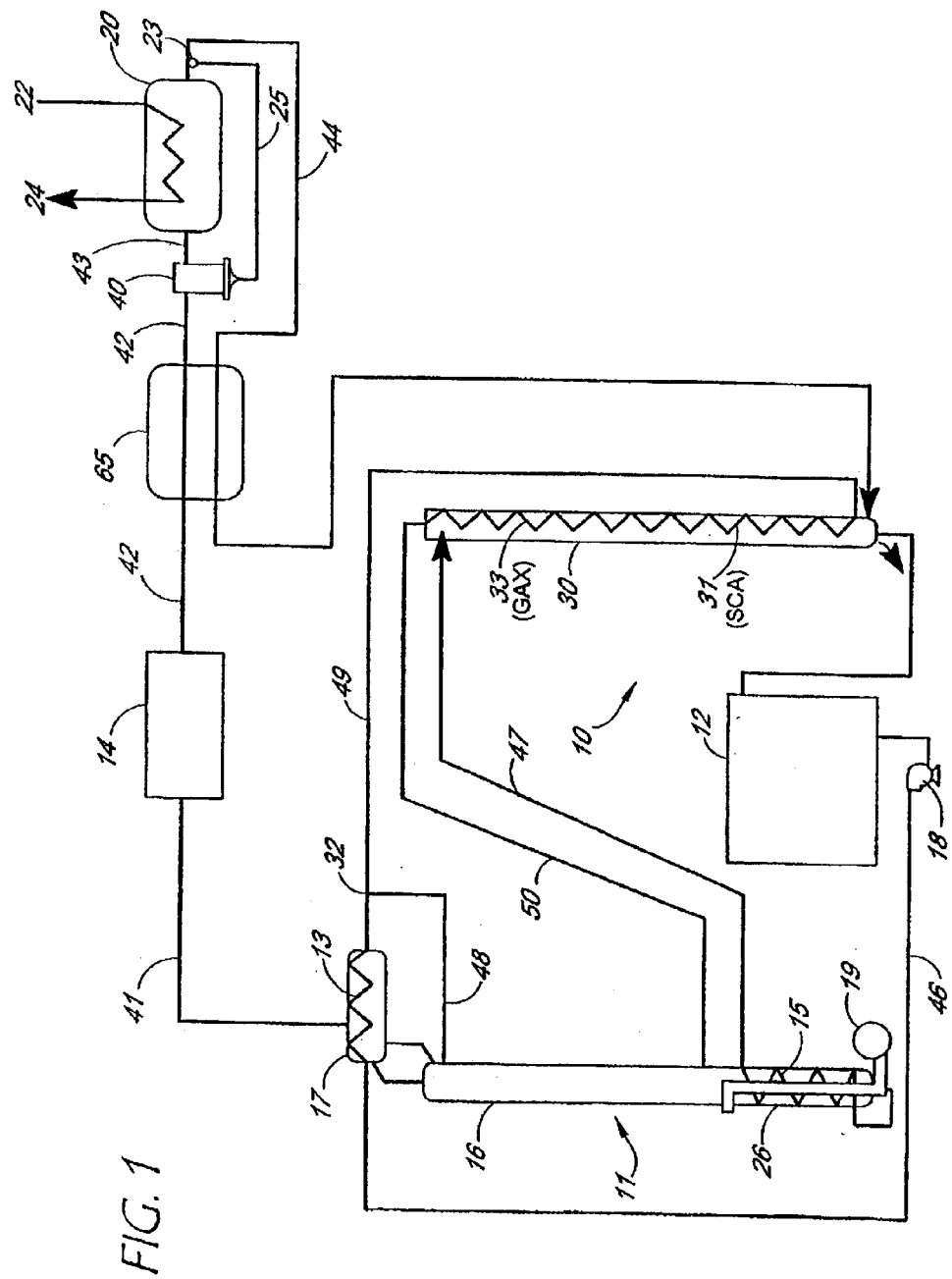
FIG. 1 is a schematic illustration of an aqua-ammonia absorption cooling system utilizing the improved method.

Evaporator performance is also improved in aqua-ammonia absorption apparatus such as described in the aforesaid application Ser. No. 09/479,277. Aqua-ammonia solutions exhibit boiling over a range of temperatures from the bubble point to the dew point. The term "superheat" may be defined as the temperature above the bubble point temperature, and although such a temperature is not true superheat, it is functionally equivalent in a single component refrigerant since most evaporation occurs at temperatures very close to the bubble point temperature. Observing FIG. 1, an aqua-ammonia generator absorber heat exchange (GAX) chiller system is shown. Components include an absorber assembly 10 having an absorber 12, an absorber heat exchange section 30 which includes a solution cooled absorber (SCA) 31, and a GAX heat exchanger 33. The generator assembly includes a generator heat exchanger 15, boiler 26 having a burner 19 for heating and vaporizing the aqua-ammonia solution, and adiabatic section 16 and rectifier section 17. A condenser 14 and an evaporator 20 are also present, as is subcooler 65, for pre-cooling refrigerant from the condenser with cold gaseous refrigerant from the evaporator. A mechanically operated valve 40 capable of rapid positive alternating closing and opening an inlet port for creating the necessary turbulent refrigerant flow as previously described: is positioned along pipe 42. A temperature sensing bulb 23 is located near the evaporator outlet on conduit 44, with pressure line 25 communicating bulb 23 with valve 40. Further description of the apparatus as well as its functioning is disclosed in aforesaid U.S. patent application Ser. No. 10/125,297, (ROCKYR.104A).

Figure 3:
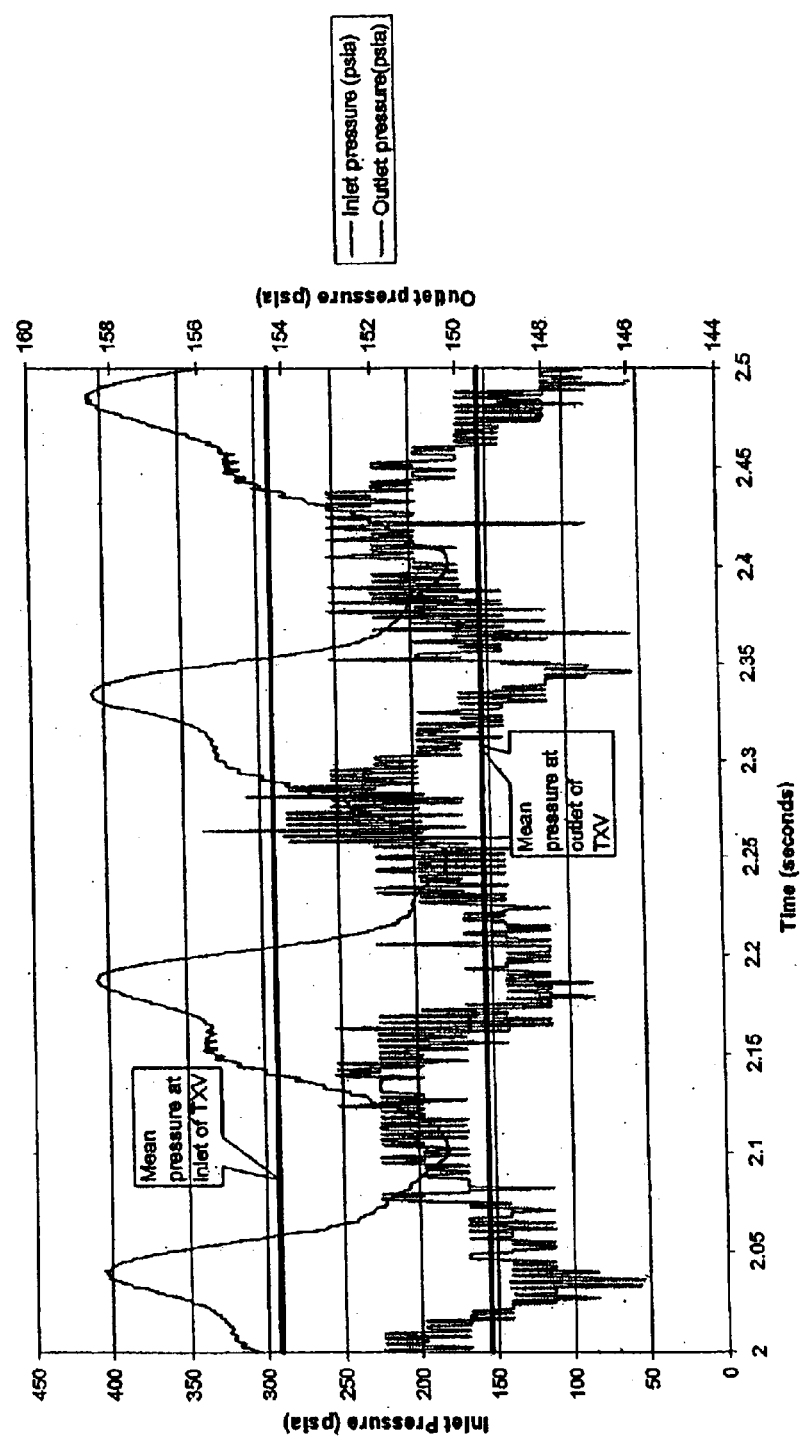
FIG. 3 is a graph illustrating pressure fluctuations at inlet and outlet ports of a valve for creating turbulence in refrigerant flow.
Figure 4:
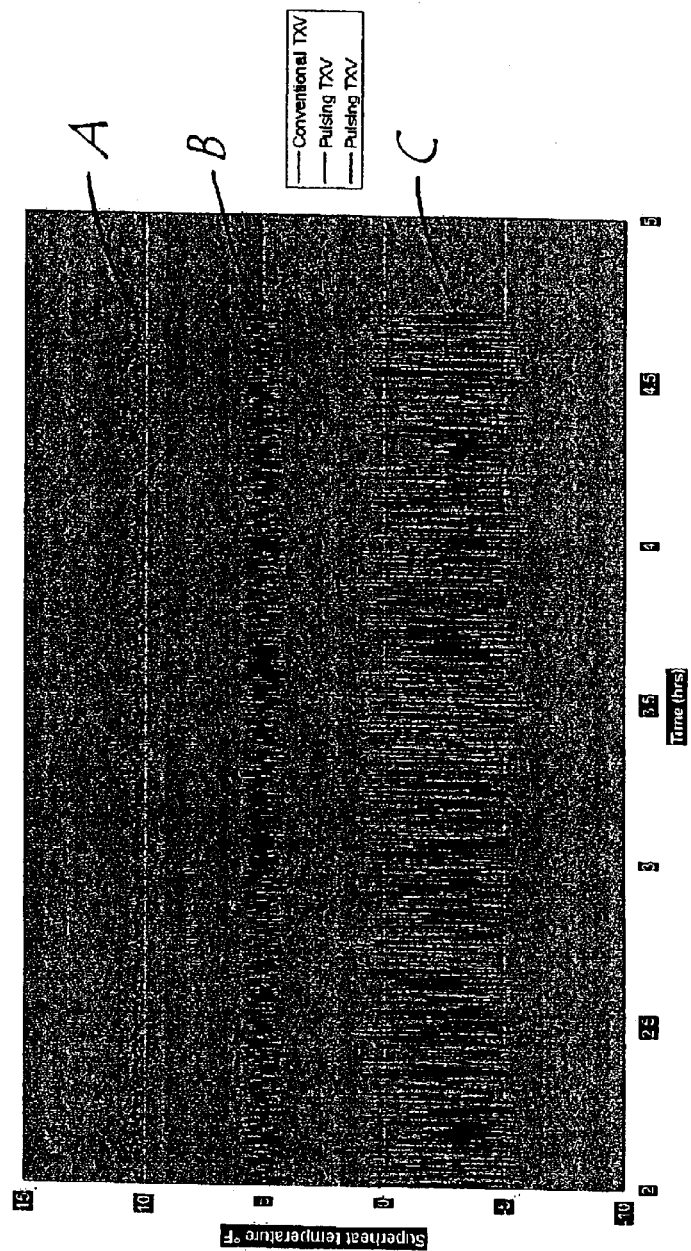
FIG. 4 is a graph illustrating evaporator superheat comparison using turbulent flow and laminar flow of refrigerant supplied to an evaporator.

FIG. 3 illustrates the effects of using a valve as previously described to create turbulence over a period of 0.5 seconds, operated at a frequency between 7 and 8 hertz with pressure fluctuations at the inlet and outlet measured using high-speed pressure transducers. The valve used is of a design shown in U.S. Pat. No. 5,675,982 and having an effective inlet/outlet ratio of 1.0, using a propane/butane bulb charge as described in the aforesaid application Ser. No. 10/125,297. By rapidly fully and alternately opening and closing the valve inlet, pressure fluctuations of the refrigerant of at least 2% from the mean pressure at the inlet are achieved. Preferably such pressure changes are at least 5% of the mean pressure and more preferably are about 10% of the mean inlet pressure. Examples of specific pressure fluctuations are at least 50 psia, preferably about 100 psia or more, and more preferably about 150 psia or more as illustrated in the graph in FIG. 3, with the mean inlet and outlet pressures also shown. By comparison, when a modulating valve or a capillary tube is used, substantially no increase or decrease of inlet or outlet pressures are achieved, with only flat mean pressures observed. In FIG. 4, a comparison of superheat between using a conventional valve and a valve as previously described and used in the results shown in FIG. 3 are illustrated. As shown, the temperature at the evaporator outlet does not oscillate substantially with turbulent flow A and B, whereas laminar flow C using a conventional modulating TXV, the superheat temperature oscillates over 5° F. Such superheat control realized by creating and supplying turbulent refrigerant flow to the evaporator thus improves evaporator capacity and heat transfer efficiency. Specifically, the evaporator efficiency is increased so that vaporization of refrigerant is carried out on over 70% of the cooling surface of the evaporator and preferably over 90% of the cooling surface. Moreover, because the turbulence created at the valve inlet is transmitted both upstream and downstream by the refrigerant, there is corresponding efficiency improvement in the condenser capacity and heat transfer.

Figure 5:
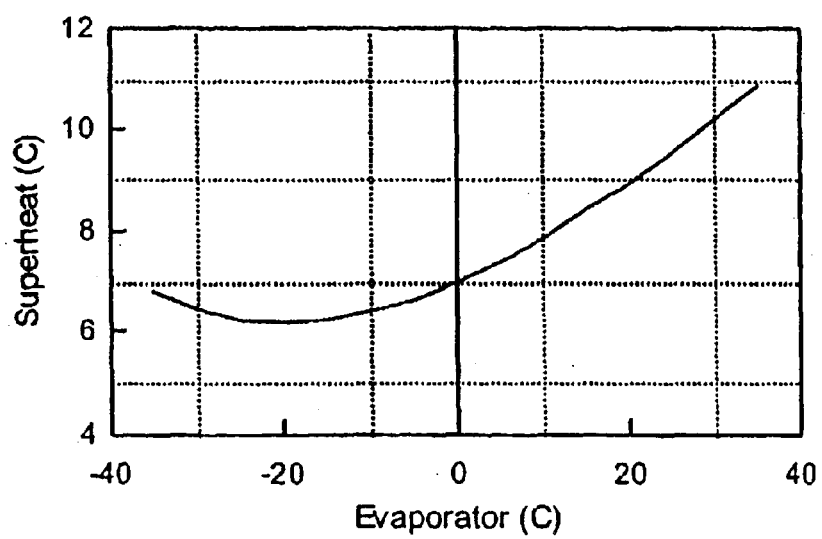
FIG. 5 is a graph showing an example of excellent superheat response in an evaporator to which R-134 refrigerant is charged using turbulent flow as described herein.

FIG. 5 illustrates an example of excellent evaporator superheat control over a large evaporator temperature range. In the example shown, a TXV as previously described is used to supply R 134a refrigerant to the evaporator. The TXV is designed with an inlet seat diameter of 0.08 in, an outlet diameter of 0.072 in, a diaphragm diameter of 1.20 inch and a bulb charge consisting of 70% butane and 30% propane.

What is claimed is:

1. A method of reducing evaporator superheat fluctuation and improving evaporator heat transfer comprises pulsating the supply of refrigerant to the evaporator sufficient to create a turbulent flow of refrigerant by providing a mechanically operated valve in a refrigerant supply line to the evaporator, the valve having a refrigerant inlet flow control port and a device and components cooperating therewith for rapidly and positively opening and closing said inlet flow control port, and operating the valve to rapidly open and close said flow control port at a frequency of between 0.5 hertz and about 500 hertz and alternately increasing and decreasing refrigerant pulsation at said inlet flow control port to provide pressure fluctuations of the refrigerant thereat of at least 2% of the mean pressure to create said turbulent flow of refrigerant supplied to the evaporator.

2. The method of claim 1 wherein said device is operated to open and close said flow control port at a frequency of between about 2 and about 40 hertz.

3. The method of claim 1 wherein the pressure fluctuation is at least 5% of the mean refrigerant pressure at said inlet port.

4. The method of claim 1 wherein the pressure fluctuation is above 10% of the mean refrigerant pressure at said inlet port.

5. The method of claim 1 comprising providing a thermostatic expansion valve having a valve inlet port and closure device capable of rapidly positively closing and opening the flow control port, a valve outlet port communicating with an evaporator inlet, and a valve cavity communicating with the flow control port and valve outlet port.

6. The method of claim 5 comprising providing a thermostatic expansion valve having a ratio of effective valve port inlet area/valve outlet port area of between about 0.2 and 5.

7. The method of claim 5 comprising providing a thermostatic expansion valve having a ratio of effective valve port inlet area/valve outlet port area of between 0.21 and 4.1.

8. The method of claim 6 comprising providing a thermostatic expansion valve having a valve cavity volume of about 1 cc or more.

9. The method of claim 8 comprising operating said valve to open and close said inlet flow control port at a rate sufficient to cause alternating pressure changes of about 100 psia.

10. A method of improving evaporator operating efficiency and performance in a vapor compression or aqua-ammonia absorption cooling, chiller, refrigeration or heat pump system in which refrigerant is vaporized in an evaporator comprising providing a mechanically operated valve in the refrigerant supply line to said evaporator, said valve having a temperature sensing bulb in thermal contact with the evaporator and cooperating with a diaphragm for operating said valve, and alternately opening and closing said inlet port at a frequency of between about 0.5 and about 500 hertz and at a rate sufficient to cause alternating refrigerant pressure changes of at least 2% of the mean pressure at said inlet port to create a refrigerant turbulent flow to said evaporator.

11. The method of claim 10 comprising providing a thermostatic expansion valve having a ratio of effective valve inlet port area/valve outlet port area of between about 0.2 and 5.0.

12. The method of claim 10 comprising providing a thermostatic expansion valve having a ratio of effective valve inlet port area/valve outlet port area of between 0.21 and 4.1.

13. The method of claim 10 comprising operating said valve to open and close said inlet port at a rate sufficient to cause alternating refrigerant pressure changes of at least 5% of the mean pressure at said inlet port.

14. The method of claim 10 comprising operating said valve to open and close said inlet port at a rate sufficient to cause alternating refrigerant pressure changes of about 10% of the mean pressure at said inlet port.

15. The method of claim 10, 11 or 12 including providing said bulb with a bulb charge comprising a mixture of propane and butane.

16. The method of claim 15 comprising providing a major amount of propane in said bulb charge.

17. A method of operating an aqua-ammonia absorption cooling and/or heating apparatus comprising an absorber assembly, a generator assembly and an absorption fluid loop for directing absorption fluid between said absorber assembly and generator assembly, a condenser, an evaporator and a refrigerant loop including piping for directing refrigerant from the generator assembly to the condenser and from the condenser to the evaporator, and a mechanically operated valve assembly cooperating with said refrigerant piping for controlling the flow of refrigerant therein, said valve assembly comprising a refrigerant flow control port in communication with said condenser for receiving condensed refrigerant and a valve for opening and closing said flow control port, the method comprising opening and closing said flow control port at a rate of between 0.5 and 500 hertz sufficient to cause alternating pressure changes at said flow control port of at least 2% of mean pressure at said port between each said opening and closing.

18. The method of claim 17 comprising opening and closing said refrigerant flow control port at a rate of between about 0.5 and about 500 hertz sufficient to cause alternating pressure changes of above about 50 psia.

19. The method of claim 18 wherein said valve comprises a thermostatic expansion valve having a valve inlet port and closure device capable of rapidly positively closing and opening the flow control port, a valve outlet port communicating with an evaporator inlet, and a valve cavity communicating with the flow control port and valve outlet port.

20. The method of claim 17 comprising operating said valve to open and close said inlet port at a rate sufficient to cause alternating refrigerant pressure changes of at least 5% of minimum pressure at said inlet port.

21. The method of claim 17 comprising operating said valve to open and close said inlet port at a rate sufficient to cause alternating refrigerant pressure changes of about 10% of the mean pressure at said inlet port.

22. A method of claim 1, 10 or 17 wherein said turbulent flow is sufficient to cause vaporization of refrigerant in over 70% of the cooling surface of the evaporator.

23. A method of claim 1, 10 or 17 wherein said turbulent flow is sufficient to cause vaporization of refrigerant in over 90% of the cooling surface of the evaporator.

24. A method of claim 1, 10 or 17 wherein said turbulent flow is sufficient to create improved condense heat transfer efficiency.

* * * * *